Feb. 16, 1954  W. STERN  2,669,007
SLOTTING SAW
Original Filed July 23, 1948  2 Sheets-Sheet 1
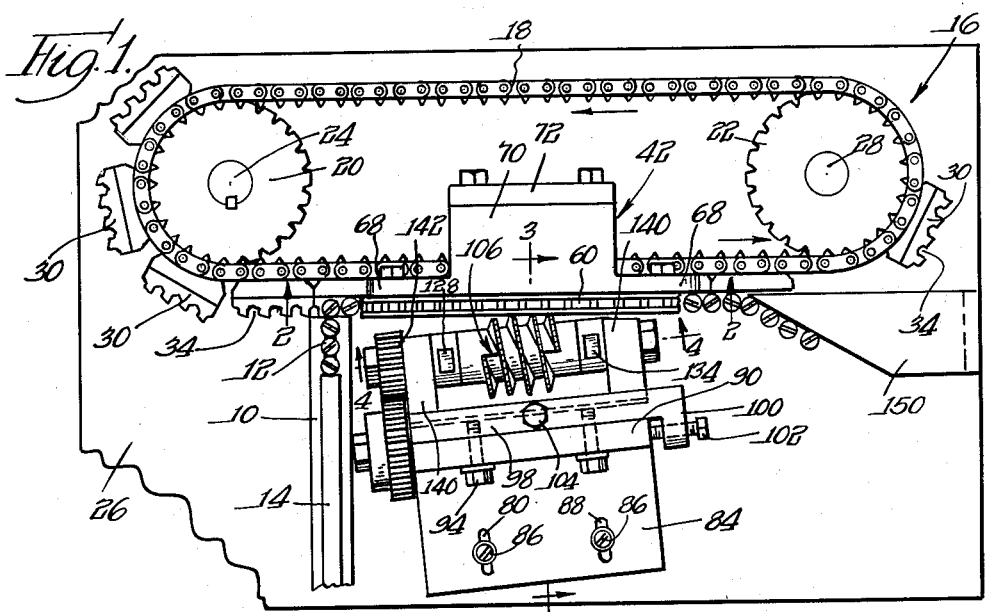
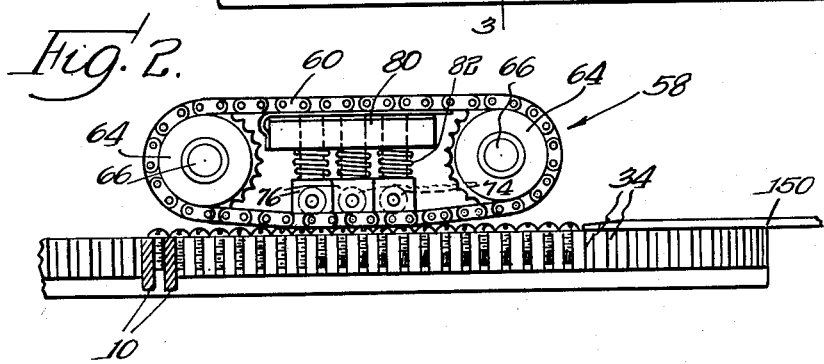
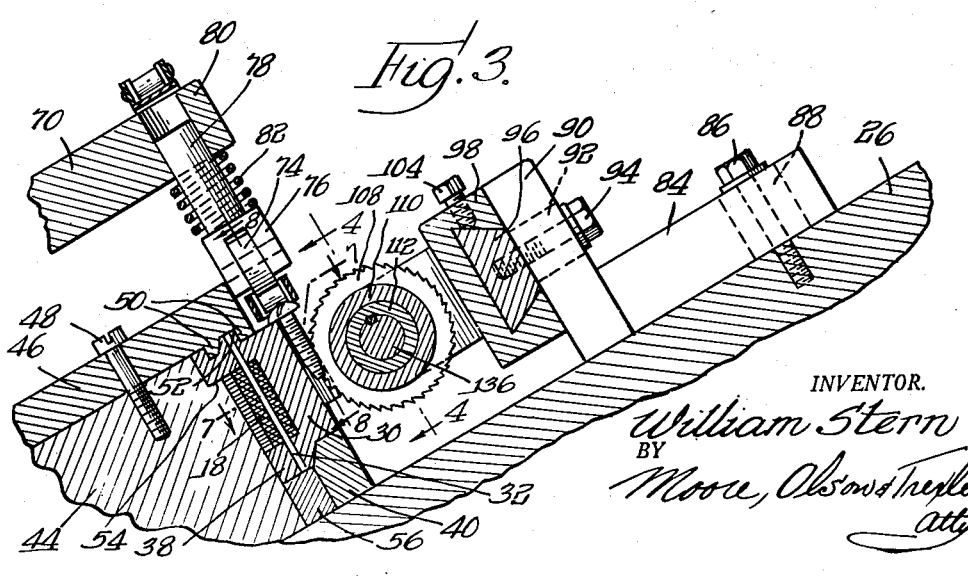
INVENTOR.
William Stern
BY
Moore, Olson & Trexler
attys.

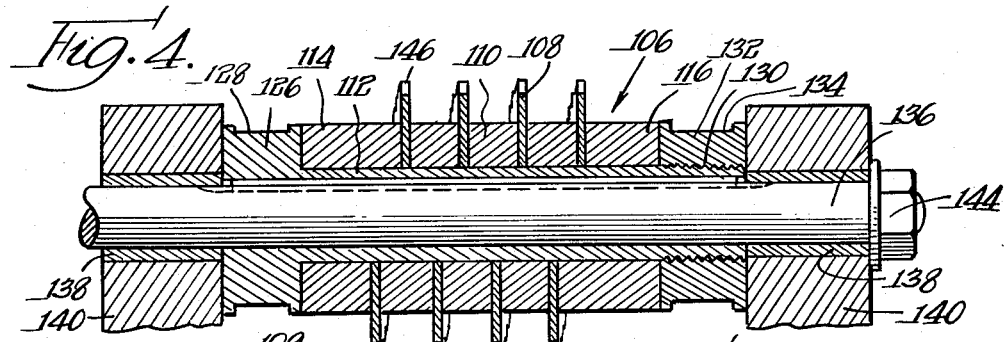
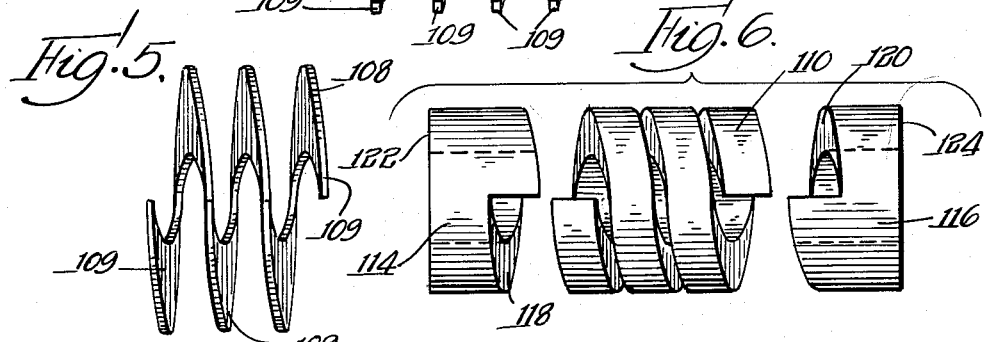
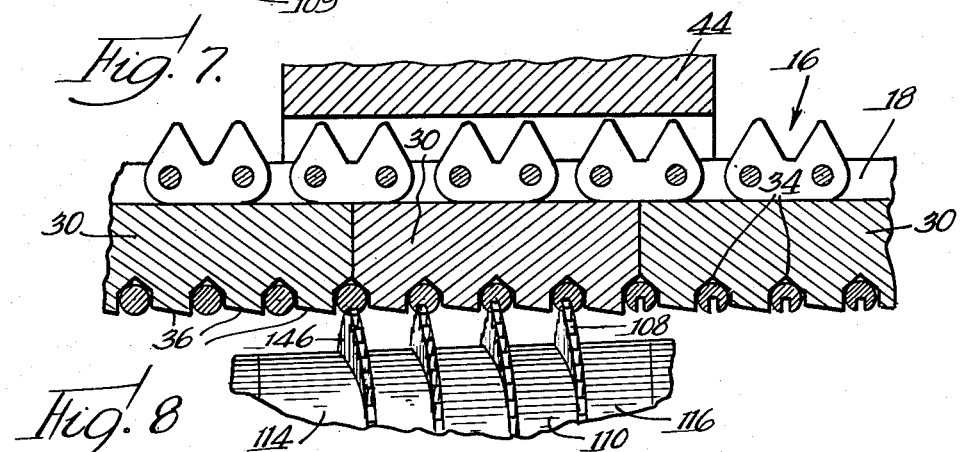
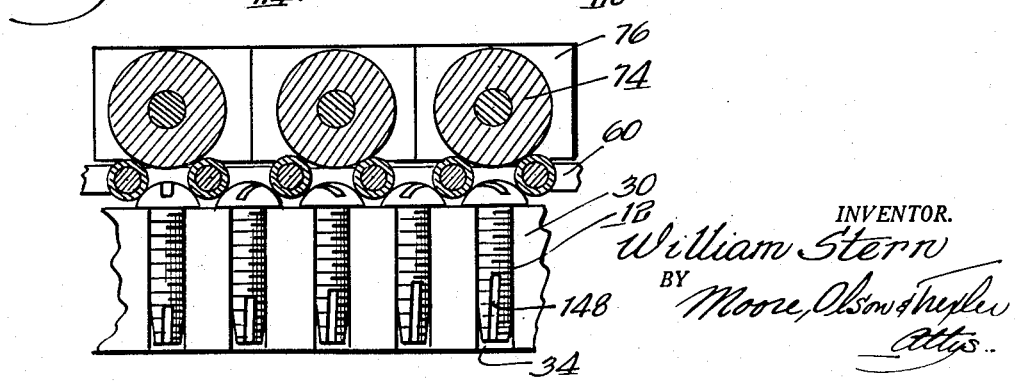

Patented Feb. 16, 1954

2,669,007

UNITED STATES PATENT OFFICE 2,669,007

SLOTTING SAW

William Stern, Park Ridge, Ill., assignor to Illinois Tool Works, Chicago, Ill., a corporation of Illinois Original application July 23, 1948, Serial No. 40,310. Divided and this application January 19, 1951, Serial No. 206,889

8 Claims. (Cl. 29—103)

This application comprises a division of my application Serial Number 40,310 filed July 23, 1948, and entitled Shank Slotter, now Patent No. 2,540,058.

This invention is concerned generally with a saw and more particularly with a saw for slotting screws.

An object of this invention is to provide a helical saw.

This invention contemplates the provision of a saw structure or cutter constructed of a plurality of helical blade sections each of which readily is replaced when worn or damaged.

An object of this invention is to provide a plurality of helical saw or cutter sections arranged in registration to form a continuous helical working edge.

A further object of this invention is to provide means for securing a plurality of helical saw or cutter sections against relative circumferential and axial movement to form a continuous helical working edge.

A more specific object of this invention is to provide means for resiliently securing a plurality of saw or cutter sections in registration against relative movement to form a continuous helical working edge.

Another object of this invention is to devise a method of making a helical saw or cutter.

Other and further objects and advantages of the present invention will be apparent from the following description when taken in connection with the accompanying drawings wherein:

Fig. 1 is a fragmentary plan view of a screw slotting machine incorporating the saw which is the subject of this invention;

Fig. 2 is a fragmentary sectional view along the line 2—2 of Fig. 1;

Fig. 3 is a fragmentary sectional view taken along the line 3—3 of Fig. 1;

Fig. 4 is a sectional view of the saw taken along the line 4—4 of Fig. 3;

Fig. 5 is a view in elevation of a screw slotting or sawing blade;

Fig. 6 is a view in elevation of parts forming a holder for the screw slotting blade or saw;

Fig. 7 is an enlarged fragmentary view in horizontal section taken substantially along the line 7—7 of Fig. 3;

Fig. 8 is a sectional view taken substantially along the line 8—8 of Fig. 3.

As shown in the drawings, a machine incorporating the saw forming the subject matter of this invention includes a screw feeding chute 10 formed by spaced bars receiving between them the shanks of screws or screw blanks 12 and supporting the heads of the screws. A cover bar 14 lies above the heads of the screw elements in the chute and prevents them from becoming tilted or jammed in the chute. The chute 10 is supplied with screw elements 12 from any suitable hopper mechanism (not shown).

A continuously moving screw carrier 16 includes a Silent chain 18 passing about a drive sprocket 20 and an idle sprocket 22. The drive sprocket 20 is keyed to a drive shaft 24 passing through a bed plate 26 and suitably mounted in bearings (not shown), and driven by any suitable drive mechanism (not shown). The sprocket 22 is journaled on a stud 28 carried by the bed plate 26. A continuous series of screw receiving blocks 30 is secured by link pins 32 (Fig. 3) to the Silent chain 18. Each block is provided with a plurality of slots or recesses 34 for receiving the shanks of screws 12 with the heads of the screws resting on the top surfaces of the blocks. Each block has half recesses or slots at the opposite ends thereof to cooperate with the next block in forming slots similar to the slots 34. Screw elements 12 received by the slots 34 from the feed chute 10 thus are spaced equally about the length of the chain and the front surfaces 36 of the blocks intermediate the recesses are inclined slightly as best may be seen in Fig. 7 to facilitate reception of screw elements from the feed chute.

The screw carrier blocks 30 have beveled depending portions 38 slidably supported by, and interfitting with, the beveled rear edge of a continuous track 40 underlying the Silent chain 18. At the slotting station 42 the chain 18 and the screw carrier blocks additionally are guided and supported against inward movement by a back-up block 44 suitably mounted on the bed plate 26. A hold-down plate 46 is fixed to the back-up block 44 by means such as bolt 48 and is provided with guide projections 50 cooperating with complementary structure 52 formed in the tops of the blocks 30. The upper outer edge of the back-up block 44 is formed with a recessed portion 54 receiving rearwardly projecting guide flanges of the blocks overlying the guide structure 52. The blocks further are supported from beneath by a strip 56. The front face of the back-up block 44 is positioned to form, as shown in Figs. 3 and 7, a guide surface and a rear support for the links of the chain 18 at the slotting station.

A hold-down mechanism 58 is provided at the slotting station 42 to prevent displacement of the screw elements while they are being slotted. The hold-down mechanism comprises a roller chain 60 passing over idler sprockets 64 journaled on studs 66 carried by mounting flanges 68 of a block 70 bolted to a bracket 72 upstanding from the bed plate 26. The lower flight or reach of the roller chain 60 passes beneath rollers 74 carried by blocks 76 secured to rods 78 slidably mounted in a forwardly projecting flange 80 of the block 70. Coil springs 82 encircle the rods 78 and are compressed between the flange 80 and the blocks 76 to cause the rollers 74 to urge the lower flight or reach of the chain 60 downwardly against the heads of the screws 12 to clamp them in the recesses in the screw carrying blocks as they pass the slotting station.

The slotting mechanism preferably comprises a first mounting block 84 adjustably secured on the bed plate 26 by means such as bolts 86 received in transversely elongated slots 88. The bolt-in-slot mounting allows the block 84 to be adjusted toward and from the screw carrying blocks 30 as they are moved by the chain 18 past the slotting station 42. The mounting block 84 is provided with an upstanding, right angularly disposed flange 90 having slots 92 for receiving mounting bolts 94 by means of which a slide guide 96 adjustably is secured to the first mounting block 58 for adjustment in a plane perpendicular to the bed plate and axially of the screws at the slotting station. A slide 98 is provided with a dovetail channel interfitting with the slide guide 96 and is provided at one end with an L-shaped bracket portion 100 extending past the end of the flange 90 of the first mounting block 84. The bracket portion 100 carries an adjusting screw 102 threaded therethrough and abutting against the end of the flange. The position of the slide 98 may be determined by adjusting the screw 102. Following adjustment, the slide 98 can be locked in position by means of a locking screw 104 threaded through the slide and impinging against the guide 96.

The slotting saw 106, as seen in Figs. 4–6, comprises a helical saw blade 108. The saw blade consists of a plurality of segments or centrally apertured disks 109 each twisted in an axial direction to form a helix, the helixes of the plurality of disks being of the same pitch and diameter, and the disk edges being registered to form the complete blade. The helical segments are brought into perfect registration by threading them into a spring-like holder 110 which consists of a helix, the space between the adjacent convolutions corresponding to the thickness of the segments of the saw blade 108 and the width of the material forming the helical holder corresponding to the distance between adjacent convolutions of the saw blade. The assembled helical saw blade and holder are mounted on a sleeve 112 between collars 114 and 116 having helically formed inner faces 118 and 120 complementary to the outer faces of the saw blade 108, the outer faces 122 and 124 of the collars being flat. The sleeve 112 is provided at one end with an integral, enlarged head portion 126 having opposed flat, or chordal surfaces 128 adapted to be engaged by a wrench or the like. The opposite end of the sleeve 112 is provided with external threads 130 and an internally threaded nut or collar 132 having opposed flat, or chordal wrench engaging surfaces 134 is threaded thereon. The nut 132 is threaded onto the sleeve 112 sufficiently far to clamp the resilient holder 110, saw blade 108, and collars 114 and 116 sufficiently tightly to insure their rotation along with the sleeve.

The sleeve 112 is mounted on a driving shaft 136 and is keyed thereto for rotation therewith. The shaft 136 is journaled in suitable bearings 138 in forwardly extending arms 140 of the slide 98 and is provided with a spur gear 142 meshing with a cooperating gear of suitable drive mechanism (not shown). The gear 142 and a nut 144 threaded on the other end of the shaft 136 secure the shaft against axial movement.

The saw segments 109 originally consist of individual, flat metallic rings or apertured disks. The rings fist are sheared or split and then are bent into helical form. After being bent into helical form, the saw segments are heat-treated, placed in a suitable helical holder, and drawn to relieve hardening stresses. The segments then are arranged in axial alignment with the ends of adjacent segments in registration by threading them into the holder 110 and clamping them between the collars 114 and 116 on the sleeve 112. After the sleeve has been mounted on the shaft 136 between the arms 140, teeth 146 are ground in the periphery of the several saw blade segments to form the saw 106.

In order to slot screw elements, a continuous succession of threaded screws or screw blanks is delivered by the gravity feed chute 10 to the blocks 30 carried by the continuously moving chain 16 and are received in the recesses 34 in the blocks in the same orientation and inclination as they are delivered at the end of the chute. As the continuously moving chain 18 carries the screw elements to the slotting station 42, they pass beneath the roller chain 60 and are clamped in the recesses 34 thereby. The saw 106 is mounted with its axis inclined slightly relative to the path of movement of screw elements 12 carried by the blocks 30 and the pitch of the saw blade is made equal to the spacing between successive screw elements carried by the blocks 30. The speed of the conveyor chain 18 is made proportionate to the lead and speed of rotation of the saw blade so that once a screw element has been engaged by the saw blade it will remain in engagement therewith until it has reached the opposite end of the blade. As best may be seen in Figs. 7 and 8, the relative inclination of the saw blade axis and the path of screw elements carried by the blocks, and the proportionate speed of the saw blade and screw elements causes each screw element relatively to approach the axis of the saw blade. Thus the saw blade removes successive increments of material from the shank of each screw element as it moves continuously past the saw to provide the final inclined slot 148 in the screw element shank.

After having slots 148 completed therein, the screw elements 12 leave the slotting station and no longer are engaged by the hold-down chain 60. The screw heads then are engaged by a surface of an ejector 150 inclined relative to the path of screw elements carried by the blocks and overlying the path to remove screw elements from the blocks. The screw elements then may drop into a container or be supplied to other apparatus (neither shown).

The virtues of the screw slotting machine utilizing my helical saw are set forth in my aforementioned co-pending application Serial Number 40,310 and the structure of the machine is claimed in that application.

The saw blade as formed herein readily is deformed from flat to helical form without excessive stress and strain due to the relatively short lengths of metal acted on, the saw blade, if damaged, readily is replaced in part, and the blade holder can be utilized indefinitely with a succession of blades.

The specific example shown and described herein is for illustrative purposes only. Various changes may be made in the method of manufacturing the saw blade without departing from the spirit and scope of the invention as set forth in the following claims.

I claim:

1. A saw comprising a saw arbor of uniform diameter, a helical saw blade arranged coaxially about said arbor, a helical blade holder substantially complementary to and interfitting with said blade, and means for mounting said blade and holder on said arbor for rotation therewith.

2. A rotary cutter comprising an arbor, a blade including a plurality of helical blade sections each being substantially flat and coiled edgewise and having a sharpened material working edge, means including a holder having a helical slot therein for arranging the blade sections in registration to form a continuous helical blade, and means for mounting said blade and holder on said arbor.

3. A saw comprising a saw arbor, a helical slotting blade arranged coaxially about said arbor, a helical spacer interfitting with the convolutions of said helical blade, end members each having a helical face abutting the end surfaces of said blade, and means for mounting said blade, helical spacer, and end members on said arbor for rotation therewith.

4. A rotary cutter comprising a blade including a plurality of helical blade sections each having a sharpened material working edge, a spacer having a helical slot therein receiving said blade sections in registration to form a continuous helical blade, a pair of end members each having a helical face interfitting with an end surface of said helical blade, and means for mounting said blade, spacer, and said end members together as a unit.

5. A slotting saw comprising a helical slotting blade, a resilient helical spacer interfitting with said blade and spacing the convolutions thereof from one another, the convolutions of said spacer normally being spaced apart farther than the thickness of said blade, a pair of end members each having a helical inner face complementary to an end face of said blade, and means for clamping said blade, spacer, and end members together to compress said spacer and grip said blade between the convolutions of said spacer and between said spacer and said end members.

6. A slotting saw comprising a saw arbor, a saw blade including a plurality of helical blade segments, a resilient helical spacer arranged coaxially with said arbor and aligning said blade segments in registration to form a continuous helical blade, end members complementary to the ends of said blade and spacer, and means for applying axial force to said end members to compress said resilient spacer and grip said blade between the turns of said spacer and said end members.

7. A slotting saw as set forth in claim 6 wherein the axial force applying means comprises an enlarged head on one end of said arbor and a nut threaded on the other end of said arbor.

8. A slotting saw comprising a cylindrical saw arbor of uniform diameter, a saw blade having a toothed periphery and including a plurality of helical blade sections each being substantially flat and coiled edgewise, a resilient helical spacer interfitting with said blade and spacing the convolutions thereof from one another, the convolutions of said spacer normally being spaced apart farther than the thickness of said blade, a pair of end members each having a helical inner face complementary to an end face of said blade, and means for clamping said blade, said spacer and said end members together on said arbor to compress said spacer and grip said blade between the convolutions of said spacer and between said spacer and said end members.

WILLIAM STERN.

References Cited in the file of this patent

UNITED STATES PATENTS

| Number | Name | Date |
|---|---|---|
| 938,158 | Lucas | Oct. 26, 1909 |
| 1,250,377 | Stevens | Dec. 18, 1917 |
| 1,473,374 | Konig | Nov. 6, 1929 |
| 2,415,271 | Baumann | Feb. 4, 1947 |
| 2,439,422 | Fear | Apr. 13, 1948 |

FOREIGN PATENTS

| Number | Country | Date |
|---|---|---|
| 161,632 | Great Britain | Apr. 15, 1921 |